July 21, 1931.  H. C. WEITZEL  1,815,535
SPRAY NOZZLE
Filed June 16, 1930
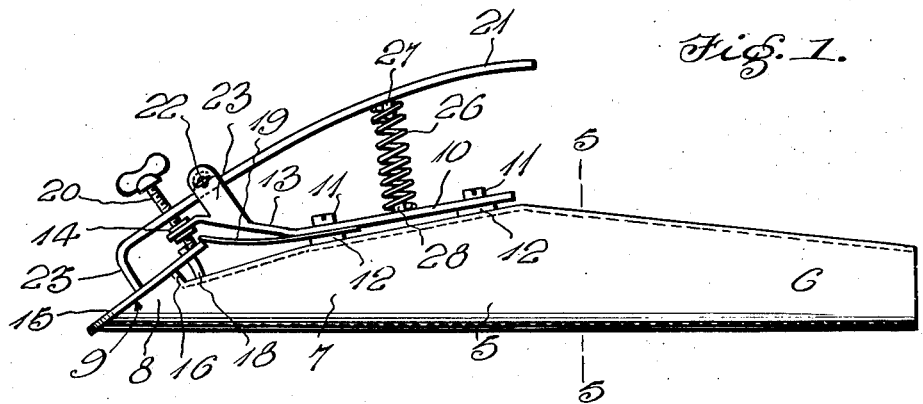
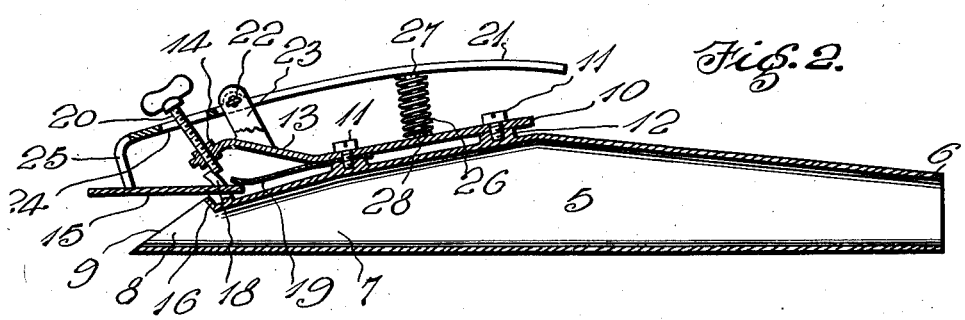
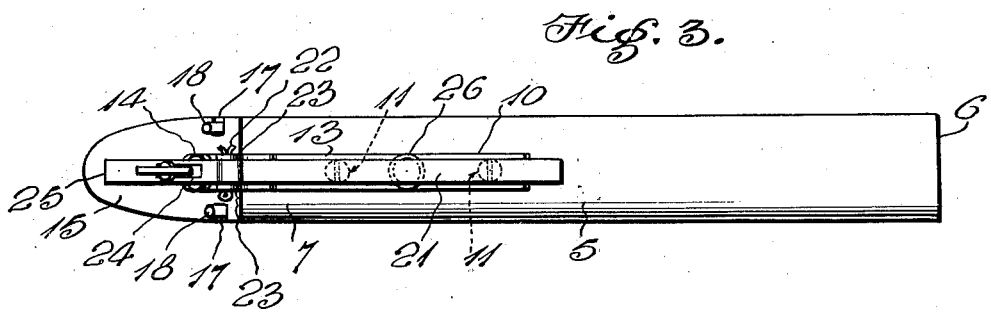
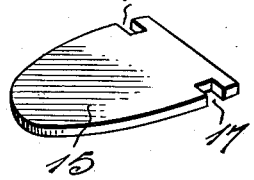
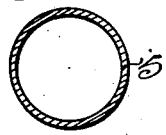
Inventor
Henry C. Weitzel
By
Attorney Patented July 21, 1931

1,815,535

UNITED STATES PATENT OFFICE

HENRY C. WEITZEL, OF SHINER, TEXAS

SPRAY NOZZLE

Application filed June 16, 1930. Serial No. 461,519.

My invention relates to improvements in spray nozzles, for spraying cotton or the like.

An important object of the invention is to provide a spray nozzle which is adjustable to define the character of the spray, and automatic in its action for maintaining the selected spray.

A further object of the invention is to provide a spray nozzle which may be quickly and conveniently adjusted for cleaning.

Other objects and advantages of the invention will be apparent during the course of the following description.

In the accompanying drawings, forming a part of this specification, and in which like numerals are employed to designate like parts throughout the same, Figure 1 is a side elevation of a spray nozzle embodying my invention, Figure 2 is a central vertical longitudinal section through the same, Figure 3 is a plan view of the spray nozzle, Figure 4 is a perspective view of the plate valve and, Figure 5 is a transverse section through the tubular body portion, taken on line 5—5 of Figure 1.

In the drawings, wherein for the purpose of illustration, is shown a preferred embodiment of my invention, the numeral 5 designates a tubular body portion, which is preferably circular in cross section. This tubular body portion includes a rear portion 6 for attachment to hose or the like, and a forward portion 7, tapering forwardly, and terminating in a mouth 8, having an inclined discharge opening 9, facing upwardly.

The numeral 10 designates a supporting plate or member which is attached to the forward portion 7 of the tubular body portion by screws 11 or the like, engaging lugs 12. The supporting plate or member 10 has a forwardly projecting angularly arranged portion 13, provided at its forward end with a boss 14, having a screw-threaded opening.

The numeral 15 designates a flat valve plate, to engage over the end of the mouth 8 and being adapted to turn upon the rear edge 16 of the mouth. The valve plate has notches 17, receiving upwardly extending lugs 18, rigidly attached to the forward nozzle portion 7. These lugs are curved and permit of the vertical swinging movement of the valve plate, but retain the same in place.

When the valve plate is released from downward pressure it is automatically swung upwardly to the open position by a leaf-spring 19, engaging above its rear end, and this leaf-spring is disposed beneath the support plate or member 10, and clamped in position by the forward screw 11. Arranged above the rear end of the valve plate, is an adjustable stop in the form of a screw 20, having screw-threaded engagement within the boss 14. The screw 20 serves to limit the closing movement of the valve plate.

Arranged above the support plate 10 is a pressure lever 21, pivotally supported near and spaced from its forward end by a pin 22 or the like, passing through a pair of spaced apertured ears 23, projecting upwardly from the forward portion 13 of the support plate and rigidly secured thereto. This pressure lever is provided with an elongated slot 24 in its forward end, through which the screw 20 projects, without engaging therewith. The movement of the pressure lever is independent of the screw 20. The pressure lever 20 is provided at its forward end with a downwardly bent extension 25, arranged to engage the top of the valve plate. A compressible coil spring 26 is disposed between the rear portion of the lever 21 and the support plate 10 is held in place by lugs 27 and 28, rigidly attached to the same.

The operation of the spray nozzle is as follows:

The screw 20 is adjusted to engage the rear end of the valve plate 15, rearwardly of its pivot 16, to limit the closing movement of the valve plate, so that the same may completely close or assume a position in close relation to the opening 9. The spring 26 acting upon the pressure lever 21 tends to hold the valve plate in the depressed position. The fluid under pressure is supplied into the tubular body portion of the nozzle, and passes beneath the valve plate, which is capable of partaking of yielding opening movements, due to the action of the spring 26. The valve plate serves to spray the liquid. When it is desired to clean the valve device, the rear end of the pressure lever 21 is depressed, Figure 2, and spring 19 then shifts the valve plate to the open position, whereby the liquid will freely discharge from the tubular body portion, and clean the same.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. A spray nozzle for fluids comprising a tubular body portion, provided with a discharge opening, a valve plate having a separate pivotal mounting upon the tubular body portion to cover the discharge opening, a spring actuated pressure lever carried by the tubular body portion and free from connection with the valve plate and engaging the valve plate to force the same toward the discharge opening, and an adjustable element arranged to engage the valve plate to regulate the extent of its closing movement.

2. A spray nozzle for fluids comprising a tubular body portion having a discharge opening, a valve plate having a separate pivotal mounting upon the tubular body portion to cover the discharge opening, a spring actuated pressure lever carried by the tubular body portion and engaging the valve plate upon one side of its pivot, and an adjustable stop element carried by the tubular body portion and engaging the valve plate upon the opposite side of its pivot.

3. A spray nozzle for fluids comprising a tubular body portion having a discharge opening, a valve plate having a separate pivotal mounting upon the tubular body portion to cover the discharge opening, pressure lever pivotally mounted upon the tubular body portion and having a part engaging the valve plate in advance of its pivot, and an adjustable screw, carried by the tubular body portion and engaging the valve plate at the rear of its pivot.

4. A spray nozzle for fluids comprising a tubular body portion having a discharge opening, a valve plate pivotally mounted upon the tubular body portion to cover the discharge opening, a pressure lever pivoted upon the tubular body portion at a point spaced from the pivotal mounting of the valve plate and having a part engaging the pivoted valve plate, said lever having a longitudinal slot, a spring arranged beneath the lever and at the rear of its pivot to swing the rear end of the lever upwardly, and an adjustable screw arranged forwardly of the pivot of the lever and carried by the tubular body portion and extending through the slot in said lever and engaging the valve plate at the rear of its pivot.

5. A spray nozzle for fluids comprising a tubular body portion having a discharge opening, a pivoted valve plate to cover the opening, a spring pressed lever carried by the tubular body portion and engaging the valve plate in advance of its pivot to move the valve plate toward the closed portion, and a spring engaging the valve plate at the rear of its pivot to move the valve plate toward the open position when the lever is shifted to the releasing position.

6. A spray nozzle for fluids comprising a tubular body portion having a discharge opening, a pivoted valve plate to cover the opening, a spring pressed lever carried by the tubular body portion and engaging the valve plate to close the same, adjustable means to regulate the extent of closing movement of the valve plate, and a separate spring acting upon the valve plate to open the same when the lever is shifted to the releasing position.

In testimony whereof I affix my signature.

HENRY C. WEITZEL.